US009165598B2

(12) United States Patent
Mahnad

(10) Patent No.: US 9,165,598 B2
(45) Date of Patent: Oct. 20, 2015

(54) PRE-COMPENSATED OPTICAL TAPE WOBBLE PATTERNS

(71) Applicant: Oracle International Corporation, Redwood City, CA (US)

(72) Inventor: Faramarz Mahnad, Brookline, MA (US)

(73) Assignee: Oracle International Corporation, Redwood City, CA (US)

(*) Notice: Subject to any disclaimer, the term of this patent is extended or adjusted under 35 U.S.C. 154(b) by 483 days.

(21) Appl. No.: 13/626,414

(22) Filed: Sep. 25, 2012

(65) Prior Publication Data
US 2014/0086029 A1 Mar. 27, 2014

(51) Int. Cl.
G11B 7/095 (2006.01)
G11B 20/10 (2006.01)
G11B 20/12 (2006.01)
G11B 20/14 (2006.01)

(52) U.S. Cl.
CPC ...... *G11B 20/10194* (2013.01); *G11B 20/1201* (2013.01); *G11B 20/1407* (2013.01); *G11B 2020/1267* (2013.01); *G11B 2020/1287* (2013.01)

(58) Field of Classification Search
None
See application file for complete search history.

(56) References Cited

U.S. PATENT DOCUMENTS

| | | | |
|---|---|---|---|
| 3,792,356 A | 2/1974 | Kobayashi et al. | |
| 5,724,327 A * | 3/1998 | Timmermans et al. | 369/47.24 |
| 6,990,058 B1 * | 1/2006 | Pleiss et al. | 369/275.4 |
| 7,239,592 B2 * | 7/2007 | Graffouliere | 369/59.23 |
| 8,582,405 B1 * | 11/2013 | Mahnad et al. | 369/47.19 |
| 2003/0026175 A1 * | 2/2003 | Otsuka et al. | 369/44.13 |
| 2005/0063277 A1 * | 3/2005 | Sugata | 369/60.01 |
| 2011/0051576 A1 * | 3/2011 | Ashizawa et al. | 369/47.14 |
| 2011/0141868 A1 * | 6/2011 | Mahnad | 369/53.2 |
| 2014/0086029 A1 * | 3/2014 | Mahnad | 369/44.13 |

FOREIGN PATENT DOCUMENTS

WO 01-75872 A2 10/2001

OTHER PUBLICATIONS

International Search Report and Written Opinion of the International Searching Authority, dated Jan. 8, 2014, for International Application No. PCT/US2013/061118, filed Sep. 23, 2013, 12 pgs.
International Search Report and Written Opinion of the International Searching Authority, dated Jan. 8, 2014, for International Application No. PCT/US2013/061300, filed Sep. 24, 2013, 14 pgs.
Hiroshi Harashima et al., Matched-Transmission Technique for Channels With Intersymbol Interference, IEEE Transactions on Communications, IEEE Service Center, Piscataway, New Jersey, vol. COM-20, No. 4, Aug. 1972, pp. 774-780.
H. Kobayashi et al., Application of Partial-Response Channel Coding to Magnetic Recording Systems, IBM Journal of Research and Development, International Business Machines Corporation, New York, New York, vol. 14, Jan. 1970, pp. 368-375.
P. Odling et al., Making MLSD-Decisions on Some Individual Symbols in a Sequence by Thresholding the Matched Filter Output, IEEE International Symposium IUM on ULM, Germany Jun. 29-Jul. 4, 1997, New York, New York, p. 75.
David R. Smith, Digital Modulation Techniques, 3rd Edition, 2004, Springer US, pp. 363-436.
Bernard Sklar, A Structured Overview of Digital Communications—A Tutorial Review—Part I, IEEE Communications Magazine, IEEE Service Center, Piscataway, New Jersey, vol. 21, No. 5, Aug. 1983, pp. 4-17.
John G. Proakis, Optimum Receivers for the Additive White Gaussian Noise Channel, Digital Communications, 4th Edition, 2001, McGraw-Hill, pp. 231-247.

* cited by examiner

*Primary Examiner* — Peter Vincent Agustin
(74) *Attorney, Agent, or Firm* — Brooks Kushman P.C.

(57) ABSTRACT

Amplitude or phase modulated un-compensated wobble patterns representing address patterns for track addresses of optical media are generated. A filter is applied to the un-compensated wobble patterns to pre-compensate the un-compensated wobble patterns. When an inverse of the filter is applied to a signal representing the pre-compensated wobble patterns in the presence of noise, the noise is suppressed and the un-compensated wobble patterns are substantially recovered.

18 Claims, 8 Drawing Sheets

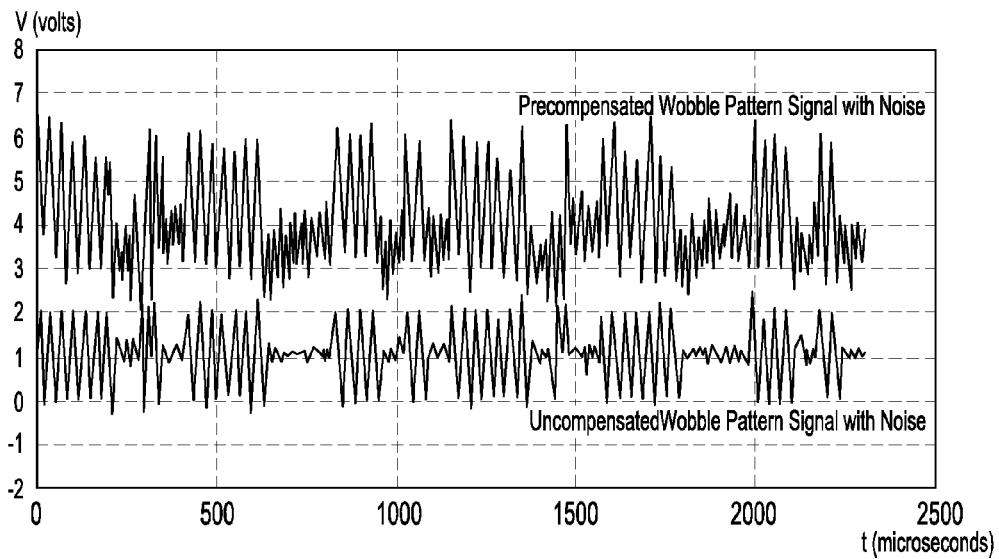
Fig-13
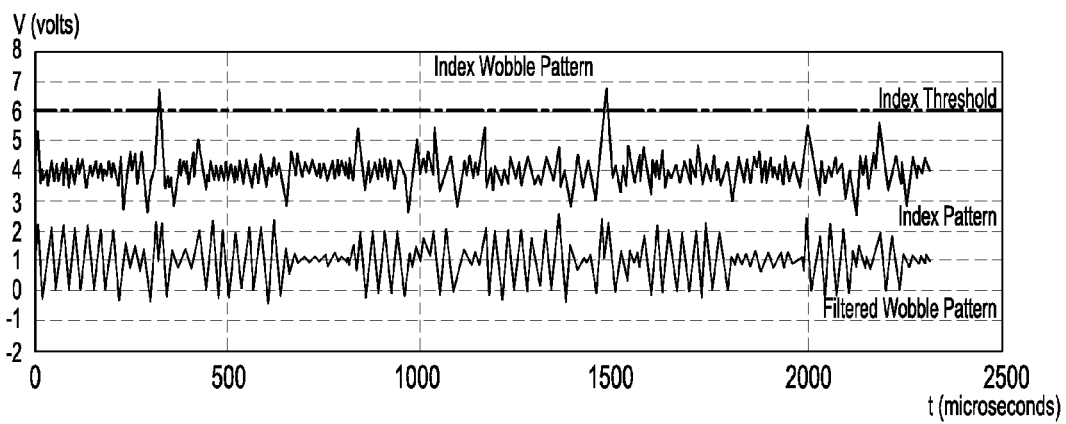
Fig-14
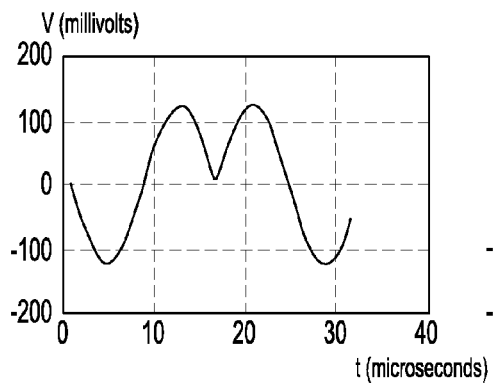 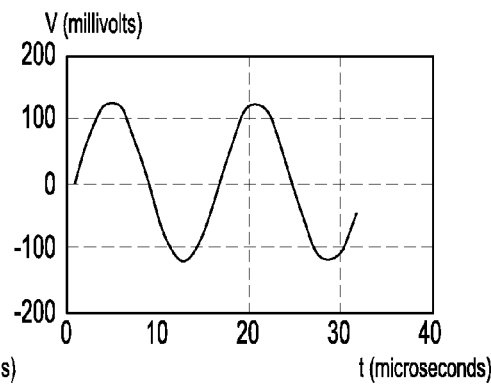
Fig-15      Fig-16

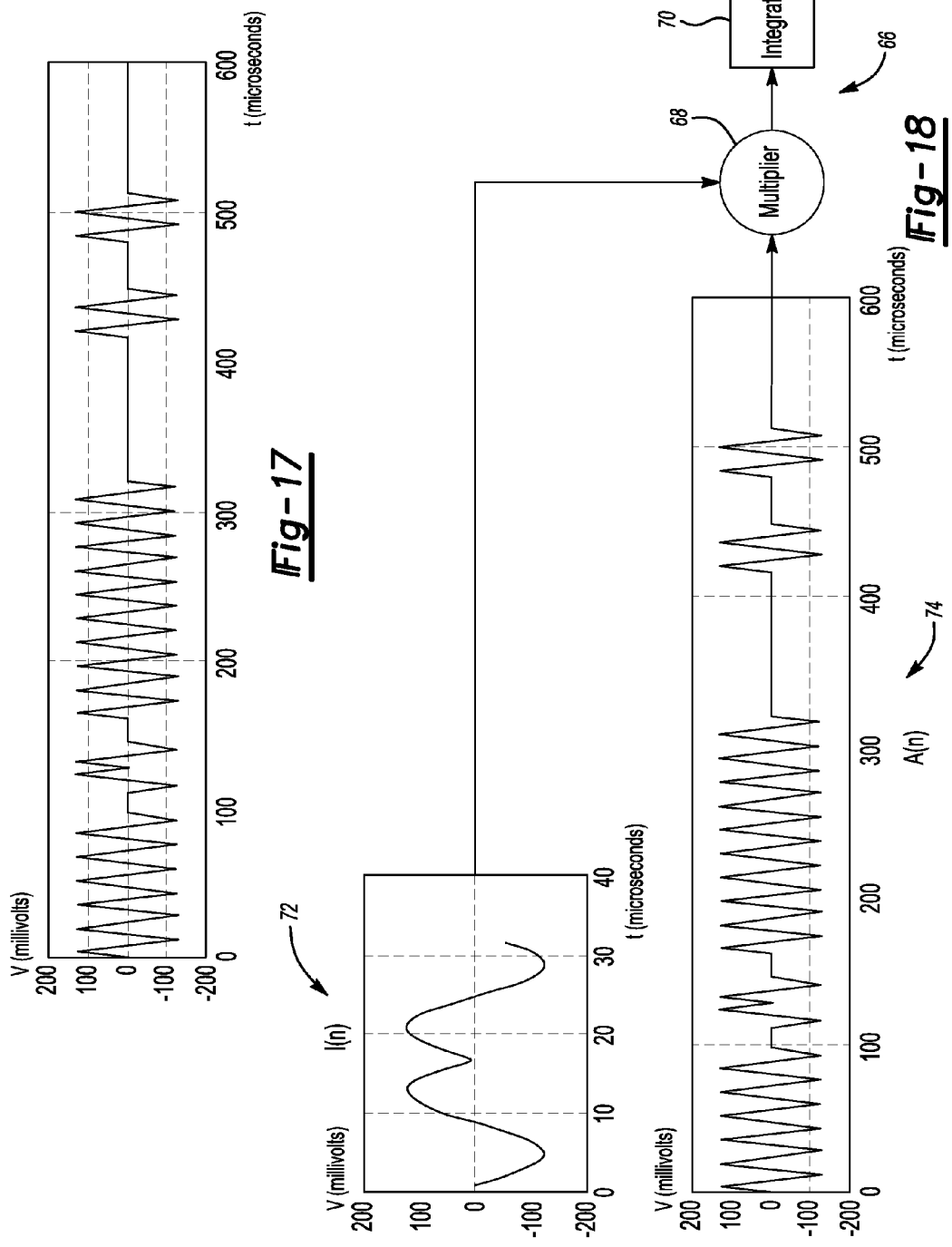

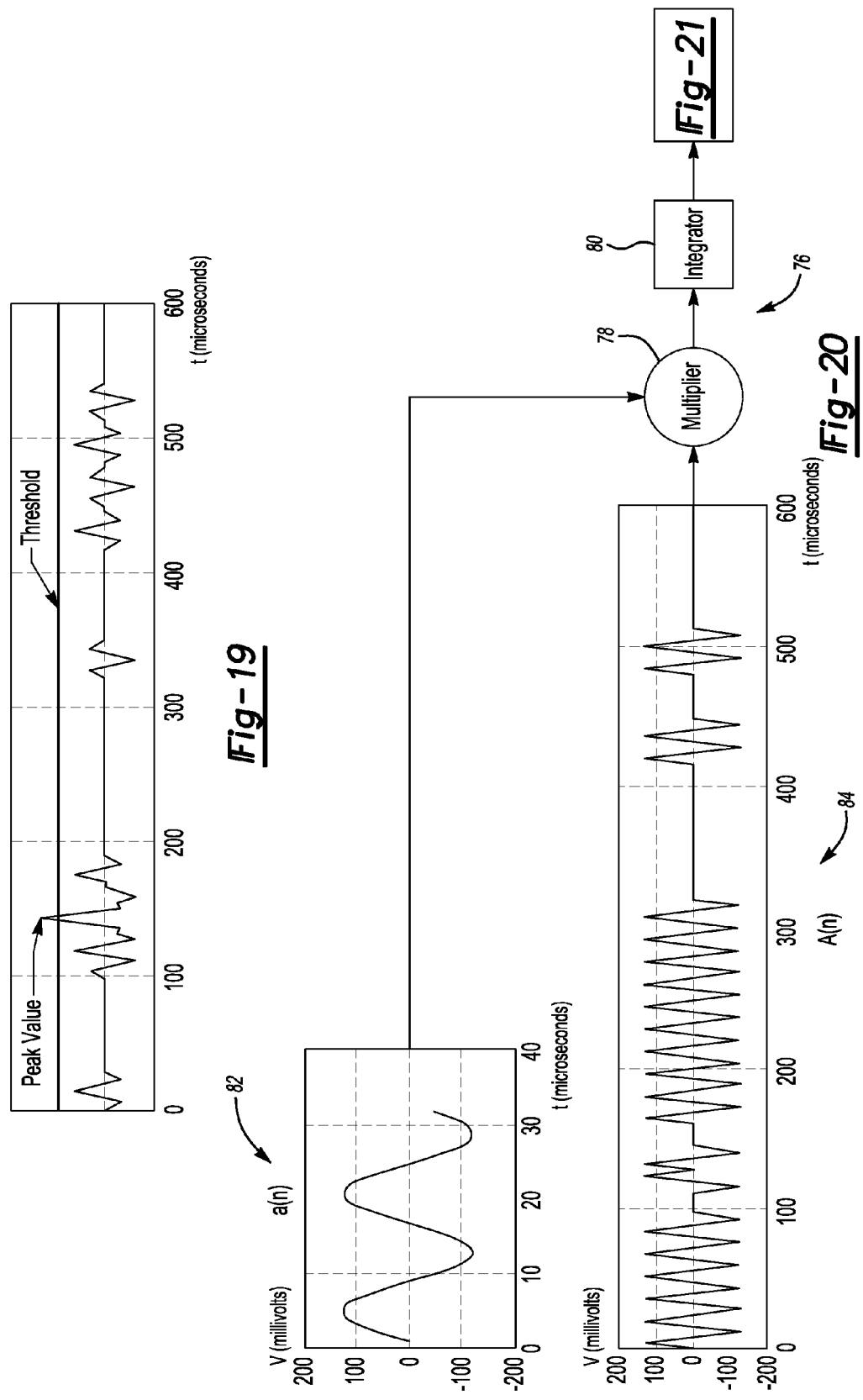

PRE-COMPENSATED OPTICAL TAPE WOBBLE PATTERNS

TECHNICAL FIELD

This disclosure relates to optical tape and the encoding of information thereon and decoding of information therefrom in the presence of noise.

BACKGROUND

Preformatting an optical media with wobbled edge land and groove tracks is an effective method for embedding recording track addresses on the media. Wobble pattern blocks are normally a sequence of frequency, amplitude or phase modulated sine waves and are utilized as building blocks for a complete address field of the media recording tracks. These address fields usually include an index subfield (IF), a timing recovery subfield (TRF) and an address bits subfield (AF).

SUMMARY

A method for encoding data on an optical media includes generating un-compensated wobble patterns representing address patterns for track addresses of the optical media and applying a filter to the un-compensated wobble patterns to generate pre-compensated wobble patterns such that when an inverse of the filter is applied to a signal representing the pre-compensated wobble patterns in the presence of noise, the noise is suppressed and the un-compensated wobble patterns are substantially recovered. The method further includes embossing the pre-compensated wobble patterns on the optical media.

An optical media encoding system includes an encoder that generates un-compensated wobble patterns representing address patterns for track addresses of an optical media and applies a filter to the un-compensated wobble patterns to generate pre-compensated wobble patterns such that when an inverse of the filter is applied to a signal representing the pre-compensated wobble patterns in the presence of noise, the noise is suppressed and the un-compensated wobble patterns are substantially recovered.

A computer-readable medium has instructions stored thereon that, when executed by a computer, cause the computer to generate un-compensated wobble patterns representing address patterns for track addresses of an optical media and to apply a filter to the un-compensated wobble patterns to generate pre-compensated wobble patterns such that when an inverse of the filter is applied to a signal representing the pre-compensated wobble patterns in the presence of noise, the noise is suppressed and the un-compensated wobble patterns are substantially recovered.

BRIEF DESCRIPTION OF THE DRAWINGS

FIGS. 12 and 13 show waveform output, without and with noise respectively, from a wobble format pattern generator.
FIG. 14 shows a waveform output of a band pass filter.
FIG. 15 shows a waveform for an index pattern in a 2 cycle tape format.
FIG. 16 shows a waveform for a '1' bit in the 2 cycle tape format.
FIG. 17 shows a waveform for an address in the 2 cycle tape format.
FIG. 18 shows the application of a matched filter tuned to the index pattern of FIG. 15.
FIG. 19 shows the result of the application of the matched filter of FIG. 18.
FIG. 20 shows the application of a matched filter tuned to the '1' bit pattern of FIG. 16.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
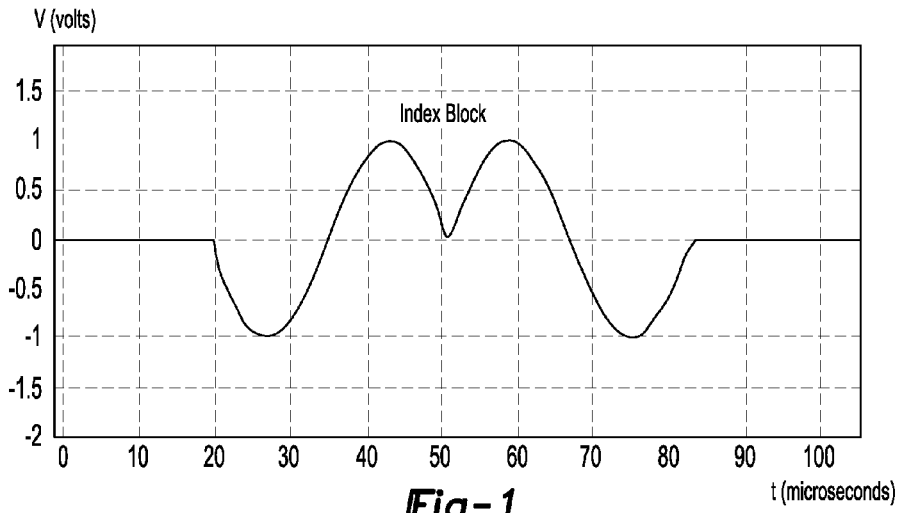
FIG. 1 shows an index block waveform.
Figure 2:
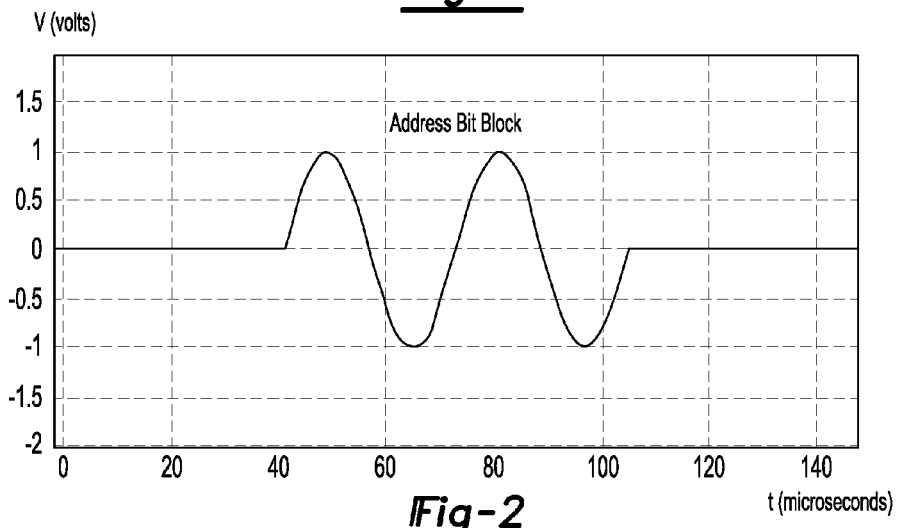
FIG. 2 shows an address bit block waveform.
Figure 3:
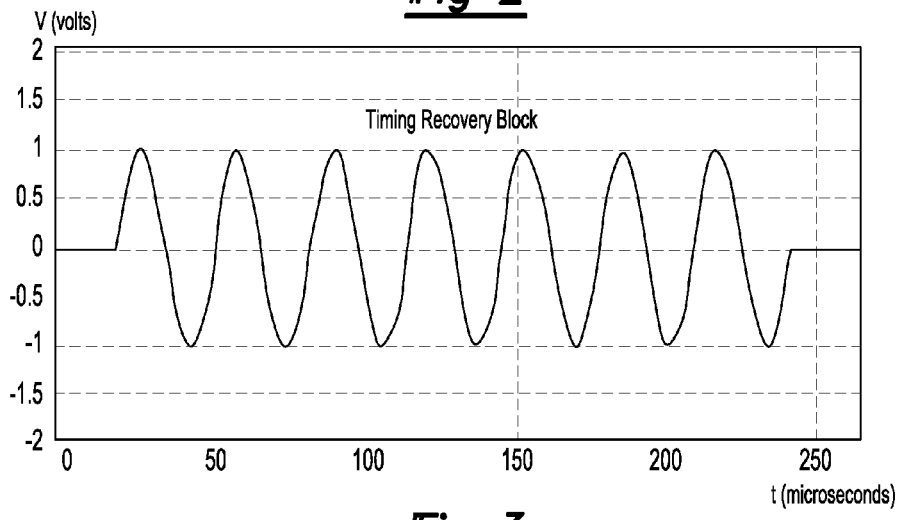
FIG. 3 shows a timing recovery block waveform.
Figure 4:
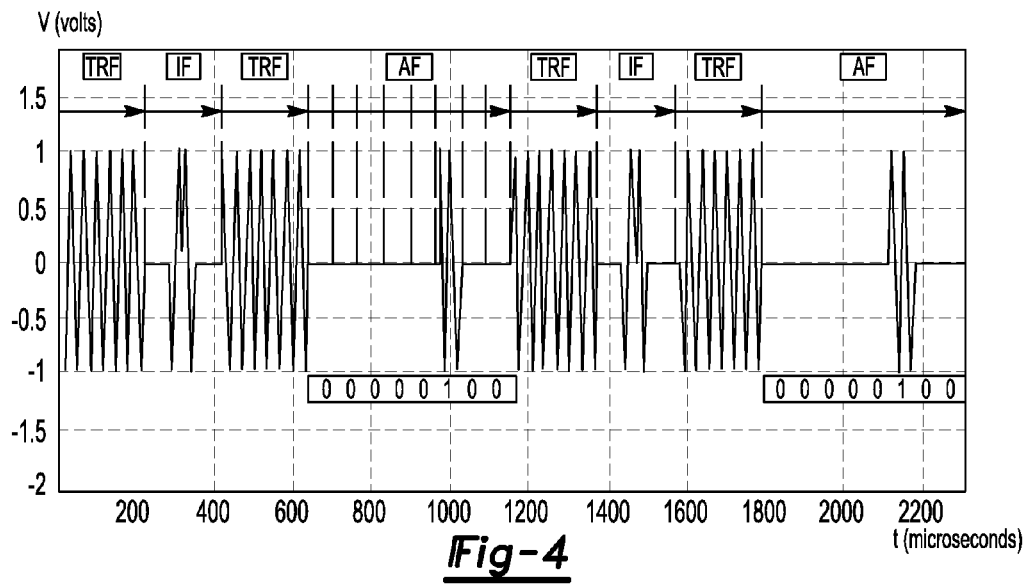
FIG. 4 shows an address pattern waveform including the blocks of FIGS. 1 through 3.

Referring to FIGS. 1 through 4, dual cycle wobble block patterns, such as the index block of FIG. 1, the address bit block of FIG. 2, and the timing recovery block of FIG. 3, have been implemented as example foundational elements of an address field pattern, such as the pattern of FIG. 4, for optical tape media. Phase modulated dual cycle blocks, in this example, represent the index or sync field (IF), a set of monotone cycle fields (TRF) around the index fields can be used for timing recovery of the decoder, and the eight subsequent pairs of cycles represent the 8 bits of the address field (AF).

Figure 5:
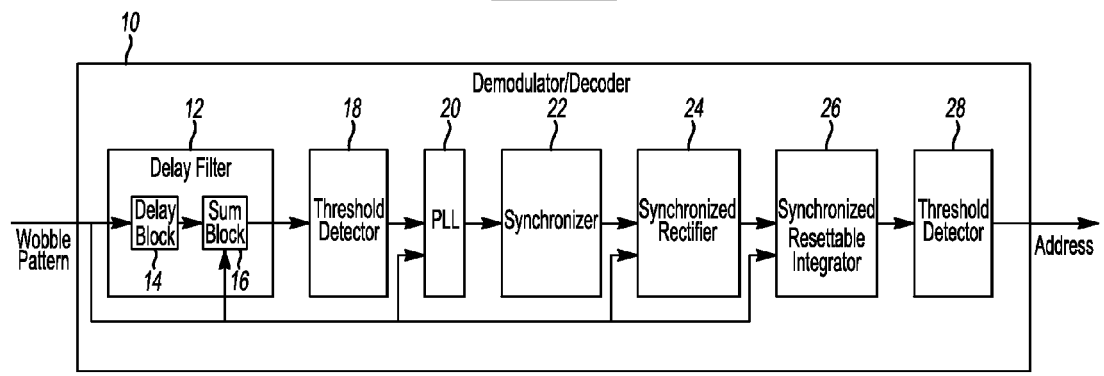
FIG. 5 is a block diagram of a track address decoder.
Figure 6:
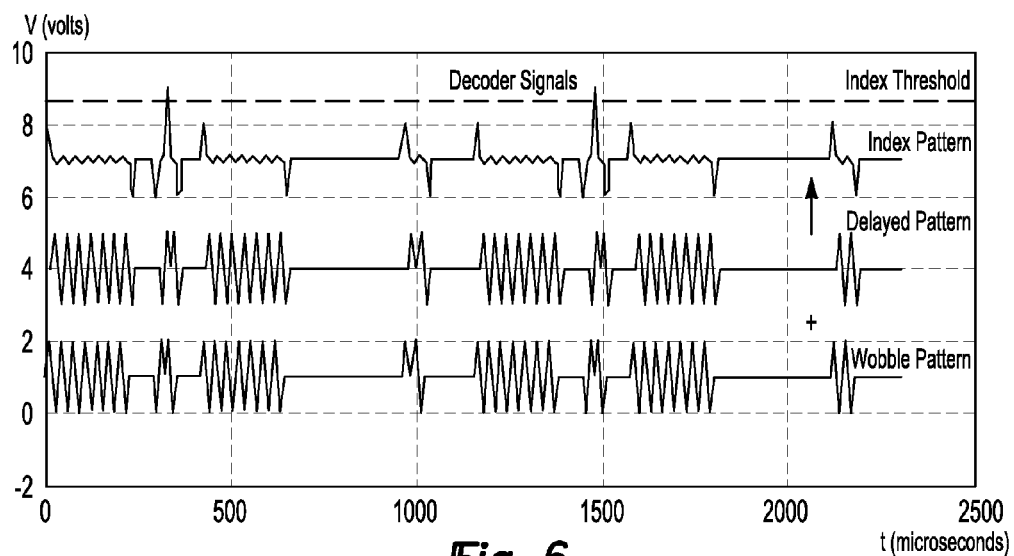
FIG. 6 shows a wobble pattern waveform (without noise) added to a delayed version of itself, and the resulting index pattern waveform.

Referring to FIGS. 5 and 6, a track address decoder 10 may include a delay filter 12, threshold detector 18, phase lock loop (PLL) 20, synchronizer 22, synchronized rectifier 24, synchronized resettable integrator 26 and threshold detector 28. The delay filter 12 may include a delay block 14 and sum block 16. A wobble pattern, such as the wobble pattern of FIG. 6, can be input to the delay block 14 and sum block 16. The resulting output of the delay block 14, such as the delay pattern of FIG. 6, can also be input to the sum block 16. The resulting output of the sum block 16, such as the index pattern of FIG. 6, can be input to the threshold detector 18. An output of the threshold detector 18 and the wobble pattern of FIG. 6 can be input to the phase lock loop 20. The resulting output of the phase lock loop 20 can be input to the synchronizer 22. An output of the synchronizer 22 and the wobble pattern of FIG. 6 can be input to the synchronized rectifier 24. The resulting output of the synchronized rectifier 24 and the wobble pattern of FIG. 6 can be input to the synchronized resettable integrator 26. The resulting output of the synchronized resettable integrator 26 can be input to the threshold detector 28. In this arrangement, an output of the threshold detector 28 yields the address associated with the wobble pattern.

The delay filter or buffer 12 generates a half cycle delayed pattern relative to the original wobble pattern. Adding the two patterns at the sum block 16 yields a detectable sync half cycle (index) that can be detected by the threshold comparator 18 when a peak value of the index pattern exceeds the index threshold. Once detected, the phase lock loop 20, locked to the monotone pattern of the timing recovery subfields discussed with reference to FIG. 4, establishes the timing of each bit of the address subfield and the address is decoded via the synchronizer 22, synchronized rectifier 24, synchronized resettable integrator 26 and threshold detector 28 as known in the art.

A robust and efficient track address coding/decoding scheme may be useful to a reliable data recoding and retrieval process as wobble patterns in optical recording systems can be susceptible to media noise and pre-formatting process imperfections. This susceptibility is due to the fact that the amplitude of physical wobble nanostructures is relatively small compared to the land and groove structures, which is caused by limitations imposed by read/write channel Inter-Symbol Interference. Hence, disclosed herein are wobble coding, pre-compensating and decoding technologies that can improve, in certain examples, effective signal-to-noise ratio (SNR) of wobble signal patterns.

Pre-Compensated Wobble Patterns

Figure 7:
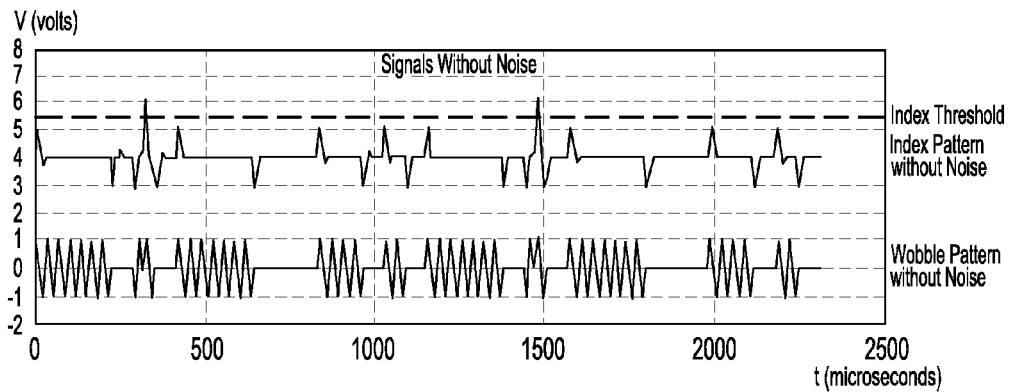
FIG. 7 shows a wobble pattern waveform (without noise) and resulting index pattern waveform.
Figure 8:
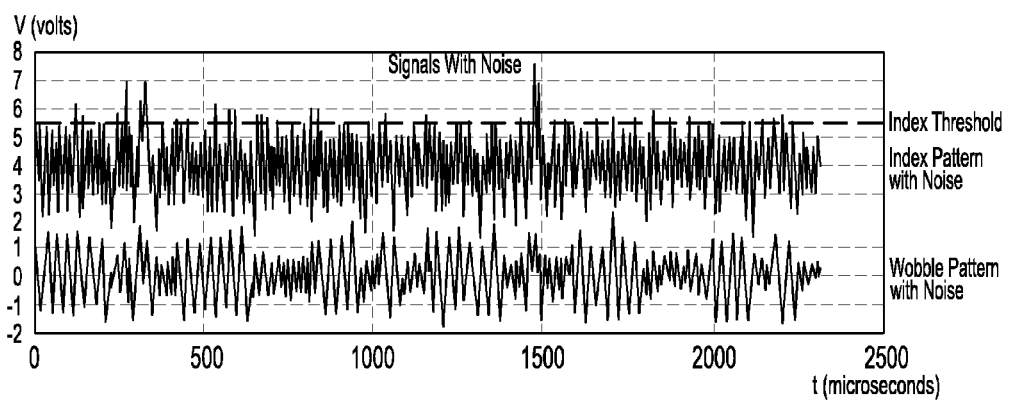
FIG. 8 shows an un-filtered wobble pattern waveform (with noise) and resulting index pattern waveform.

Referring to FIGS. 7 and 8 respectively, example decoder performance is examined without and with noise in the channel. Under excessive noise, the reliability of decoder functionality may be compromised as the decoder may be unable to distinguish between data embedded in the signal and noise associated with the signal. Peak values of the index pattern (with noise) that do not correspond with an index field of the wobble pattern (with noise), for example, may exceed the index threshold. This may lead the decoder to falsely detect an index field. Likewise, peak values of the index pattern (with noise) that correspond with an index field of the wobble pattern (with noise), for example, may not exceed the index threshold. This may lead the decoder to not detect an index field.

Figure 9:
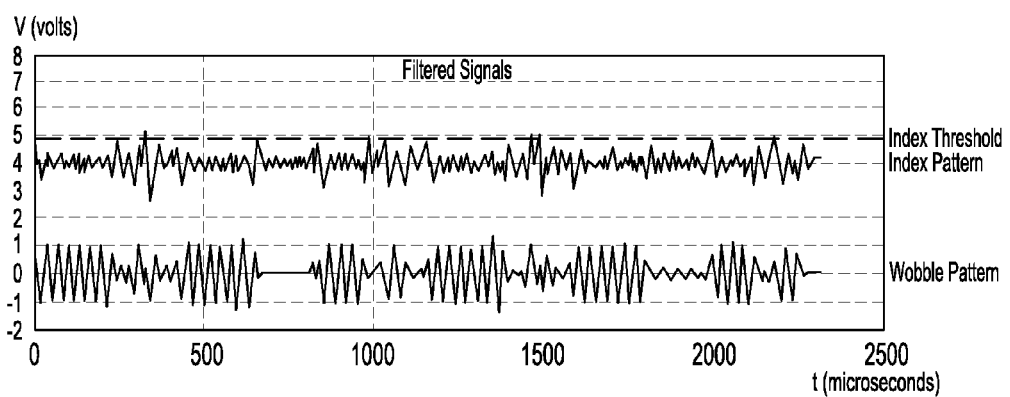
FIG. 9 shows a filtered wobble pattern waveform and resulting index pattern waveform.

Referring to FIG. 9, index pattern SNR can be improved by applying a narrow band pass (BP) filter to the wobble signal centered at pattern carrier frequency. Because the wobble signal is amplitude and phase modulated, however, the application of a narrow BP filter can change the shape of the patterns and thus impact the performance of the decoder. That is, the decoder may be unable to decode the filtered index signal because, for example, peak values of the filtered index that exceed the index threshold signal may no longer correspond to address index blocks.

Certain pre-compensating strategies can apply an inverse filter (e.g., an inverse BP filter centered at the carrier frequency, an inverse low pass (LP) filter having a corner frequency at the carrier frequency, etc.) to wobble patterns prior to imprinting (formatting) of the media. The imprinted wobble patterns on the media are pre-compensated such that decoder filtering (e.g., BP filtering, LP filtering, etc.) of the read back wobble pattern yields (substantially) the original signal shape at an output of the filter.

Figure 10:
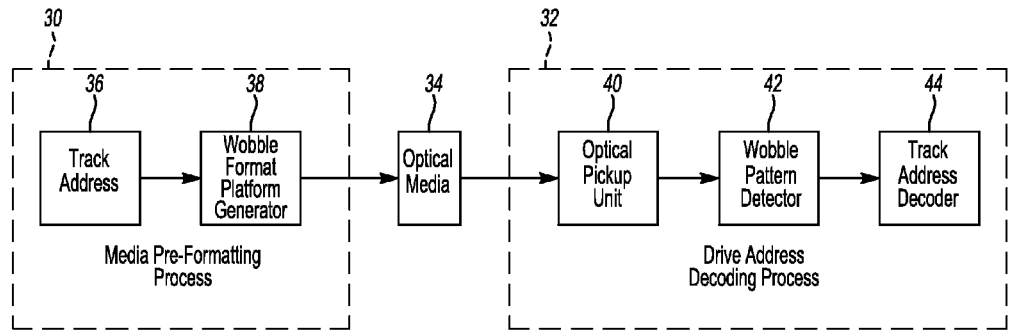
FIGS. 10 and 11 are block diagrams of signal processing systems.

Referring to FIG. 10, a traditional signal processing block diagram includes a media pre-formatting process 30 and drive address decoding process 32 for an optical media 34. During the pre-formatting process 30, track address information 36 is input to a wobble format pattern generator 38 to pre-format the optical media 34. During the drive address decoding process 32, an optical pickup unit 40 reads data from the optical media 34. The data then is input to a wobble pattern detector 42 and track address decoder 44 as known in the art. As mentioned above however, the drive address decoding process 32 may be hampered by excessive noise associated with the signal.

Figure 11:
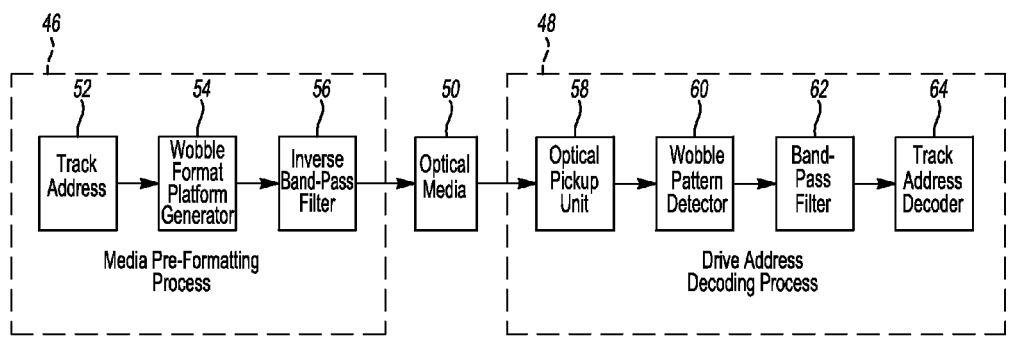

Referring to FIG. 11, an example of an improved signal processing block diagram includes a media pre-formatting process 46 and drive address decoding process 48 for an optical media 50. During the pre-formatting process 46, track address information 52 is input to a wobble format pattern generator 54, which generates, in certain examples, amplitude and phase modulated un-compensated wobble patterns representing address patterns for track addresses of the optical media 50. An inverse BP filter 56 is applied to pre-compensate the un-compensated wobble patterns. The pre-compensated wobble patterns are then embossed on the optical media 50.

During the drive address decoding process 48, an optical pickup unit 58 reads data from the optical media 50. The data is then input to a wobble pattern detector 60, a BP filter 62 and track address decoder 64. Application of the BP filter 62, however, does not change the shape of the wobble patterns in such a way so as to make them unrecognizable to the track address decoder 64 because the inverse BP filter 56 pre-compensated the wobble patterns to account for shape altering effects associated with the application of the BP filter 62.

Figure 12:
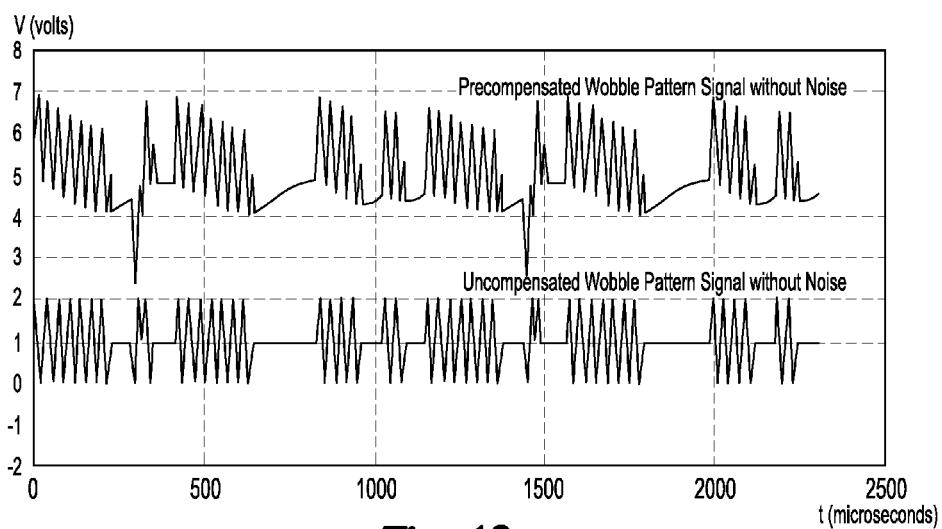

Referring to FIGS. 12 and 13 respectively, example output without and with noise in the channel from the wobble format pattern generator 54 (original wobble pattern signal) and inverse BP filter 56 (pre-compensated wobble pattern signal) is illustrated. As discussed above, application of the BP filter 56 prior to embossing on the optical media 50 alters the waveform of the wobble patterns such that after application of the BP filter 62 during the drive address decoding process 48, the wobble patterns can be decoded by the track address decoder 64.

Referring to FIG. 14, example output from the BP filter 62 (filtered wobble pattern) is illustrated along with the index pattern that results from adding a delayed version to itself as discussed with reference to FIG. 5. BP filtering suppresses noise and substantially yields the original wobble address pattern. As mentioned above, this signal is then input to the track address decoder 64, which operates much like the track address decoder 10 of FIG. 5. The index decoder of the track address decoder is thus able to detect the sync field of the index wobble pattern by detecting index wobble pattern peak values above a threshold even though noise was in the channel because there is little change to cycle pattern shape of the original wobble signal. That is, peak values greater than the index threshold still correspond to address index blocks of the decoded wobble pattern.

Matched Filter Based Optical Tape Decoding

Referring to FIGS. 15 though 17, track addresses in certain tape formats can be coded in wobble as a series of sine waves as mentioned above. Blocks of address bits are delineated by index patterns, such as the index pattern of FIG. 15. The addresses are encoded as gray-coded values with the presence of a multi-cycle (e.g., dual cycle) sine wave, such as the '1' bit waveform of FIG. 16, representing a '1' bit and the absence of such representing a '0' bit. Rapid and reliable address decoding for the address pattern of FIG. 17, which includes the waveforms of FIGS. 15 and 16, in the presence of tracking noise, for example, can facilitate timely reading and writing of data. Technology described herein can decode addresses using a matched filter approach for index and bit detection. These matched filters, in certain circumstances, can be advantageous because of their ability to reject out-of band signal noise.

In one example, track address information can be decoded using two different matched filters: one having coefficients representing the index waveform of FIG. 15 and another having coefficients representing the '1' bit waveform of FIG. 16. Referring to FIG. 18, an index encoded within an address waveform, such as the address waveform of FIG. 17, can be detected by applying a matched filter 66 including a multiplier 68 and integrator 70 and tuned to the dual cycle waveform of FIG. 15 according to $$Ri(T)=\Sigma_{x=0}^{33} I((T+1)*33-x)*A(33*T+x) \quad \text{Equation 1}$$

where Ri(T) is the output of the filter 66 and T is the sample time of the decoder (T=0, 1, 2, 3, ...). That is, the filter output, Ri(T), is the convolution of the index waveform, I(n), and the address waveform, A(n). Put a different way, a prototype dual cycle index signal pattern 72 similar to that illustrated in FIG. 15 can be input to the multiplier 68 along with an address pattern 74 similar to that illustrated in FIG. 17; output of the multiplier 68 is then input to the integrator 70.

Referring to FIG. 19, output of the integrator 70 is illustrated. Index detection occurs when a peak signal value exceeds a predetermined threshold. This threshold can be determined for each coding scheme through, for example, experimentation, etc. The address decoder first searches for an index. Once detected, it then switches modes and searches for a predetermined pattern of bits to confirm a location of the index.

Referring to FIG. 20, a '1' bit can be detected by applying a matched filter 76 including a multiplier 78 and integrator 80 and tuned to the '1' bit waveform of FIG. 16 according to $$Ra(T)=\Sigma_{x=0}^{33} \alpha((T+1)*33-x)*A(33*T+x) \quad \text{Equation 2}$$

where Ra(T) is the output of the filter 76 and T is the sample time of the decoder (T=0, 1, 2, 3, ...). That is, the filter output, Ra(T), is the convolution of the '1' bit waveform, a(n), and the address waveform, A(n). Put a different way, a prototype '1' bit signal pattern 82 similar to that illustrated in FIG. 16 can be input to the multiplier 78 along with an address pattern 84 similar to that illustrated in FIG. 17; output of the multiplier 78 is then input to the integrator 80.

Figure 21:
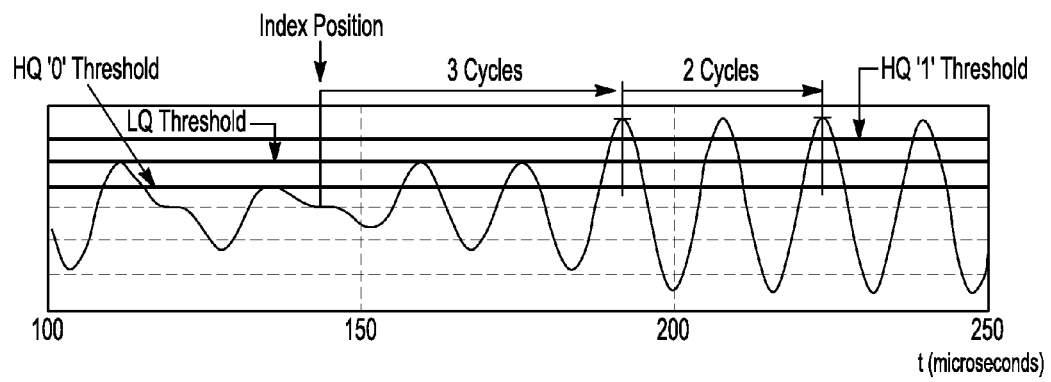
FIG. 21 shows timing requirements to confirm an index.

Referring to FIG. 21, output of the integrator 80 is shown. Certain address formats place three '1' bits at a pre-determined time after the index waveform. The index can be confirmed by detecting these three '1' bits. '1' bits are detected based on the result of a matched filter tuned to the '1' bit of FIG. 16. To be valid, these '1' bits should have correct amplitude and timing from the index. Once the index has been confirmed, address bits are detected by searching for peaks in the matched filter response to the '1' bit of FIG. 16. '1' bits are confirmed by amplitude and timing from the most recently detected '1' bit. For address detection, a quality of the bit is also assigned. This quality provides an indication of the likelihood of the bit having been mis-detected.

Figure 22:
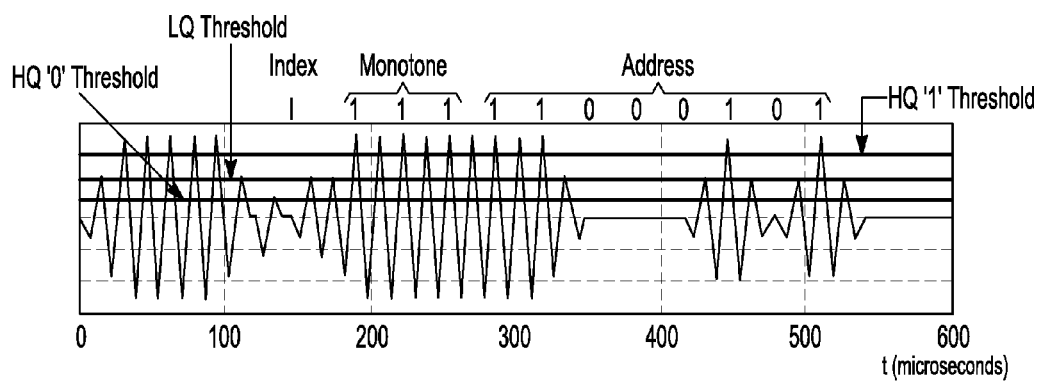
FIG. 22 shows a waveform having an index, three '1' bits, and address bits.

Referring to FIG. 22, a fully decoded address from the signal of FIG. 17 is illustrated. A high quality (HQ) '1' bit is detected if the peak in the '1' bit tuned matched filter output is above a pre-determined threshold and is at the expected time after the last '1' bit detection. An HQ '0' bit is detected if the peak is below a different pre-determined threshold. Low quality bits are detected if the peak is between these two thresholds. A low quality (LQ) '1' bit is detected if the peak is below the HQ '1' bit threshold but above an intermediate threshold (LQ threshold). A low quality '0' bit is detected if the peak is below the intermediate threshold but above the HQ '0' bit threshold. These threshold values can be determined for each coding scheme through, for example, experimentation, etc.

In the example of FIG. 22, the index is confirmed by three '1' bits (monotone) with the correct timing from the index. The address, in this example [1 1 0 0 0 1 0 1], is then detected. All 8 address bits happen to be of high quality. This same approach can be used to decode addresses coded with tri cycle or other patterns.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many non-transitory forms including information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for encoding data on an optical media comprising:
   generating un-compensated wobble patterns representing address patterns for track addresses of the optical media;
   applying a filter to the un-compensated wobble patterns to generate pre-compensated wobble patterns such that when an inverse of the filter is applied to a signal representing the pre-compensated wobble patterns in the presence of noise, the noise is suppressed and the un-compensated wobble patterns are substantially recovered; and embossing the pre-compensated wobble patterns on the optical media.

2. The method of claim 1, wherein the wobble patterns have a carrier frequency and wherein the filter is an inverse band-pass filter centered at the carrier frequency.

3. The method of claim 1, wherein the wobble patterns have a carrier frequency and wherein the filter is an inverse low-pass filter having a corner frequency at the carrier frequency.

4. The method of claim 1, wherein the wobble patterns include dual cycle phase shifted wobbles representing address index sub-fields.

5. The method of claim 1, wherein the wobble patterns include dual cycle wobbles representing address bits sub-fields.

6. The method of claim 1, wherein the wobble patterns include multi-cycle wobbles representing timing recovery sub-fields.

7. An optical media encoding system comprising:

an encoder configured to generate un-compensated wobble patterns representing address patterns for track addresses of an optical media and to apply a filter to the un-compensated wobble patterns to generate pre-compensated wobble patterns such that when an inverse of the filter is applied to a signal representing the pre-compensated wobble patterns in the presence of noise, the noise is suppressed and the un-compensated wobble patterns are substantially recovered.

8. The system of claim 7, wherein the wobble patterns have a carrier frequency and wherein the filter is an inverse band-pass filter centered at the carrier frequency.

9. The system of claim 7, wherein the wobble patterns have a carrier frequency and wherein the filter is an inverse low-pass filter having a corner frequency at the carrier frequency.

10. The system of claim 7, wherein the wobble patterns include dual cycle phase shifted wobbles representing address index sub-fields.

11. The system of claim 7, wherein the wobble patterns include dual cycle wobbles representing address bits sub-fields.

12. The system of claim 7, wherein the wobble patterns include multi-cycle wobbles representing timing recovery sub-fields.

13. A non-transitory computer-readable medium having instructions stored thereon that, when executed by a computer, cause the computer to (i) generate un-compensated wobble patterns representing address patterns for track addresses of an optical media and (ii) apply a filter to the un-compensated wobble patterns to generate pre-compensated wobble patterns such that when an inverse of the filter is applied to a signal representing the pre-compensated wobble patterns in the presence of noise, the noise is suppressed and the un-compensated wobble patterns are substantially recovered.

14. The medium of claim 13, wherein the wobble patterns have a carrier frequency and wherein the filter is an inverse band-pass filter centered at the carrier frequency.

15. The medium of claim 13, wherein the wobble patterns have a carrier frequency and wherein the filter is an inverse low-pass filter having a corner frequency at the carrier frequency.

16. The medium of claim 13, wherein the wobble patterns include dual cycle phase shifted wobbles representing address index sub-fields.

17. The medium of claim 13, wherein the wobble patterns include dual cycle wobbles representing address bits sub-fields.

18. The medium of claim 13, wherein the wobble patterns include multi-cycle wobbles representing timing recovery sub-fields.

* * * * *

UNITED STATES PATENT AND TRADEMARK OFFICE
CERTIFICATE OF CORRECTION

| | | |
|---|---|---|
| PATENT NO. | : 9,165,598 B2 | Page 1 of 1 |
| APPLICATION NO. | : 13/626414 | |
| DATED | : October 20, 2015 | |
| INVENTOR(S) | : Mahnad | |

It is certified that error appears in the above-identified patent and that said Letters Patent is hereby corrected as shown below:

In the specification

Column 4, line 62, delete "though" and insert -- through --, therefor.

Signed and Sealed this
Seventh Day of June, 2016

Michelle K. Lee
*Director of the United States Patent and Trademark Office*